United States Patent
Kito et al.

(10) Patent No.: US 9,855,840 B2
(45) Date of Patent: Jan. 2, 2018

(54) FUEL SUPPLY APPARATUS

(71) Applicant: TOYODA GOSEI CO., LTD., Kiyosu-shi, Aichi-ken (JP)

(72) Inventors: Hiroaki Kito, Kiyosu (JP); Yoshinari Hiramatsu, Kiyosu (JP); Sanae Noro, Gifu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/168,453

(22) Filed: May 31, 2016

(65) Prior Publication Data
US 2016/0361993 A1  Dec. 15, 2016

(30) Foreign Application Priority Data

Jun. 11, 2015  (JP) .................................. 2015-118063
Apr. 8, 2016  (JP) .................................. 2016-077903

(51) Int. Cl.
*B60K 15/04*   (2006.01)
*B60K 15/035*  (2006.01)

(52) U.S. Cl.
CPC ........ *B60K 15/03519* (2013.01); *B60K 15/04* (2013.01); *B60K 2015/03576* (2013.01)

(58) Field of Classification Search
CPC .... B60K 15/04; B60K 15/03519; F16L 37/40
USPC ................................. 220/86.2, 746; 137/187
See application file for complete search history.

(56) References Cited

U.S. PATENT DOCUMENTS

2005/0257839 A1* 11/2005 Kaneko .................. F16K 24/04
                                                                137/587
2006/0185739 A1   8/2006 Niki et al.
2007/0108211 A1*  5/2007 Zhu ......................... B63B 25/12
                                                                220/367.1

FOREIGN PATENT DOCUMENTS

JP    2006-070917 A    3/2006
JP    2006-234045 A    9/2006
JP    2008-057388 A    3/2008

* cited by examiner

*Primary Examiner* — King M Chu
(74) *Attorney, Agent, or Firm* — Posz Law Group, PLC

(57) ABSTRACT

A fuel supply apparatus includes a filler neck that is configured to provide a fuel passage communicating with a filler port, and a breather port that is protruded from the filler neck to be connected with a breather pipe. At least part of a valve that is configured to allow for recirculation of the air from the breather piped to the fuel passage is placed inside of the breather port. This allows for downsizing of the configuration in the vicinity of the breather port in the filler neck.

10 Claims, 15 Drawing Sheets

SCHEMATIC VIEW IN
DIRECTION OF ARROW X

SCHEMATIC VIEW IN
DIRECTION OF ARROW X

SCHEMATIC VIEW
IN DIRECTION OF ARROW X

FUEL SUPPLY APPARATUS

CROSS-REFERENCE TO RELATED APPLICATION APPLICATIONS

The present application claims priority from Japanese patent applications P2015-118063 filed on Jun. 11, 2015, and P2016-077903 filed on Apr. 8, 2016, the contents of which are hereby incorporated by reference into this application.

BACKGROUND

Technical Field

The invention relates to a fuel supply apparatus.

Description of the Related Art

In a fuel supply apparatus built in a vehicle, the air is entrained by the fuel during fueling to enter a fuel tank. The air entering the fuel tank is recirculated from the fuel tank to a filler neck through a breather pipe. For the purpose of recirculation of the air, a proposed configuration of the fuel supply apparatus provides a valve-placing connector in a breather port of a filler neck that forms a fuel passage and connects the valve-placing connector with a breather pipe (JP 2006-70917A).

In the fuel supply apparatus of the above proposed configuration, a valve for adjusting recirculation of the air is placed in the connector for connecting the breather pipe with the breather port. This proposed configuration is advantageous for downsizing the configuration in the vicinity of the filler neck for connecting the breather pipe. In recent years, there has been a high demand for downsizing of components of the vehicle. Further downsizing of the configuration in the vicinity of the breather port in the filler neck is accordingly needed.

SUMMARY

In order to solve at least part of the problems described above, the invention may be implemented by aspects described below.

(1) According to one aspect of the invention, there is provided a fuel supply apparatus. This fuel supply apparatus comprises a filler neck that is configured to provide a fuel passage communicating with a filler port; and a breather port that is protruded from the filler neck to be connected with a breather pipe. At least part of a valve that is configured to allow for recirculation of the air from the breather pipe to the fuel passage is placed inside of the breather port.

In the fuel supply apparatus of this aspect, recirculation of the air from the breather pipe to the fuel passage similar to recirculation of the air in an existing apparatus can be achieved by simple connection of the breather port with the breather pipe without using any additional connector in the neighborhood of the breather port. The fuel supply apparatus of this aspect accordingly allows for downsizing of the configuration in the vicinity of the breather port.

(2) In the fuel supply apparatus of the above aspect, the valve may have a housing configured to place the valve therein, and the housing and the valve may be mounted and held in the breather port. This enhances the mountability of the valve in the breather port and enables the valve to be readily mounted in an air passage in the breather port.

(3) In the fuel supply apparatus of the above aspect, the valve may be provided as an assembled component placed in the housing and may be mounted as the assembled component into the breather port to be held in the breather port. This enhances the mountability of the valve in the breather port and facilitates mounting of the valve.

(4) In the fuel supply apparatus of the above aspect, the valve may be placed in a housing, and the housing may be formed by the breather port. In this aspect, the breather port substitutes for the housing. This decreases the total number of components and thus achieves cost reduction.

(5) In the fuel supply apparatus of any of the above aspects, the valve may comprise the valve element that is configured to be operated to open and close an opening formed in the housing at an end of the breather port; and a pressing member that is configured to press the valve element to close the opening. This ensures recirculation of the air from the breather pipe to the fuel passage by the operation of the valve element to open and close the opening. This also enables a higher flow of the air to be recirculated to the fuel passage when the air pressure in the breather pipe is increased.

(6) In the fuel supply apparatus of the above aspect, the valve element may be configured to be reciprocated relative to or to be operated to open and close relative to a valve seat provided to surround the opening. This ensures recirculation of the air from the breather pipe to the fuel passage by either the reciprocation or the opening/closing operation of the valve element relative to the valve seat.

(7) In the fuel supply apparatus of the above aspect, the valve may have an orifice that is configured to provide recirculation of the air even in a state that the opening is closed by the valve element. This ensures recirculation of the air at a flow rate allowed by the orifice even in the state that the opening is closed by the valve element.

(8) In the fuel supply apparatus of the above aspect, the orifice may be provided in either one of the valve element and the housing. This configuration increases the flexibility of selection of where the orifice is to be provided. A recessed groove may be provided in the valve seat on which the valve element is seated, in order to ensure recirculation of the air.

DESCRIPTION OF THE EMBODIMENTS

A. First Embodiment

Figure 1:
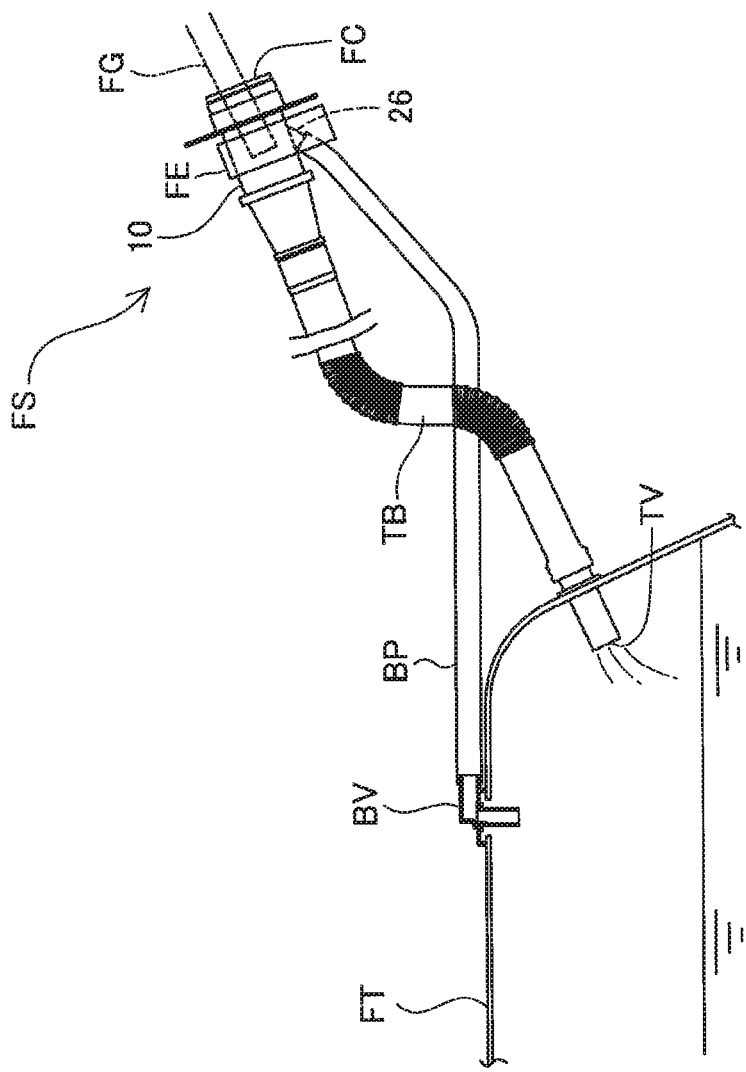
FIG. 1 is a diagram illustrating the schematic configuration of a fuel supply apparatus to supply a fuel to a fuel tank of a motor vehicle.

FIG. 1 is a diagram illustrating the schematic configuration of a fuel supply apparatus FS to supply a fuel to a fuel tank FT of a motor vehicle. The fuel supply apparatus FS includes a filler neck 10 according to a first embodiment, a breather port 26, a filler tube TB, a check valve TV a breather pipe BP, a gas release valve BV and a mounting member FE. The filler neck 10 is fixed to a fuel supply part (not shown) of the vehicle by the mounting member FE and serves to receive a fuel gun FG that is inserted into a filler port FC. This filler neck 10 is connected with the fuel tank FT by the filler tube TB and the breather pipe BP. The filler tube TB is, for example, a resin tube having an accordion structure at two different locations to be extensible and bendable to some extent. This filler tube TB is connected with the fuel tank FT via the check valve TV. The fuel discharged from the fuel gun FG inserted in the filler port FC flows through a fuel passage defined by the filler neck 10 as described later and the filler tube TB and is supplied to the fuel tank FT via the check valve TV. The check valve TV serves to prevent the backflow of the fuel from the fuel tank FT to the filler tube TB.

The breather pipe BP has one end connected with the fuel tank FT via the gas release valve BV and the other end connected with the breather port 26 that is protruded from the filler neck 10. The gas release valve BV serves as a joint to connect the breather pipe BP with the fuel tank FT. The air in the tank includes fuel vapor and flows from the gas release valve BV into the breather pipe BP. The fuel vapor is guided with the supplied fuel to flow through the filler tube TB to the fuel tank FT during fueling from the fuel gun FG.

Figure 2:
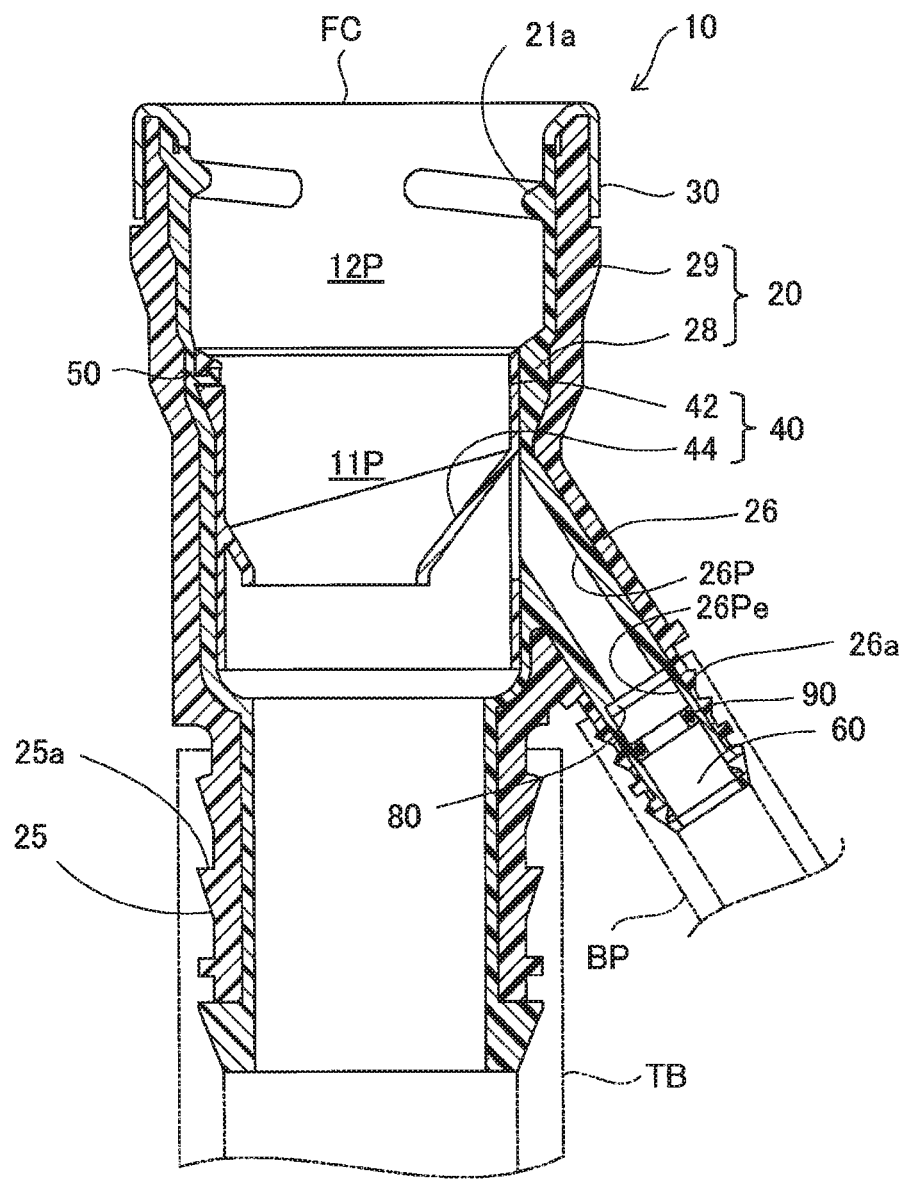
FIG. 2 is a diagram illustrating a section of a filler neck in a longitudinal direction according to a first embodiment.

The following describes the configuration of a main part of the fuel supply apparatus FS. FIG. 2 is a diagram illustrating a section of the filler neck 10 in a longitudinal direction. As illustrated, the filler neck 10 is a mechanism configured to feed the fuel discharged from the fuel gun FG (shown in FIG. 1) through the filler tube TB (shown in FIG. 1) that connects with a lower end of the filler neck 10, to the fuel tank FT and includes a neck body 20, a retainer 30, a nozzle guide member 40 and a valve 60. In the filler neck 10, the neck body 20 has a stepped cylindrical shape and forms a fuel passage 11P extended from the filler port FC on its retainer 30-side to an end of the neck body 20. A portion of the fuel passage 11P is parted by the nozzle guide member 40, and a filler port FC-side of the fuel passage 11P forms an insertion passage 12P.

The neck body 20 has a threaded portion 21a provided on an inner wall of the retainer 30-side to receive a fuel cap (not shown) screwed thereto. The nozzle guide member 40 is mounted to the neck body 20 in an approximate middle area of the fuel passage 11P, and an end portion of the fuel passage 11P forms a neck connecting portion 25. The neck connecting portion 25 has a ring-shaped projection 25a provided on its outer periphery. The filler tube TB is inserted on the neck connecting portion 25 and is connected with the neck connecting portion 25 in such a state as to be retained by the ring-shaped projection 25a. The neck body 20 also includes the breather port 26 that is protruded from the mounting location of the nozzle guide member 40. This breather port 26 is a tubular body branched off from a side wall of the neck body 20 to form an air passage 26P that is branched off from the fuel passage 11P. The breather port 26 similarly has a ring-shaped projection 26a provided on its outer periphery. The breather pipe BP is inserted on the breather port 26 and is connected with the breather port 26 in such a state as to be retained by the ring-shaped projection 26a. The breather pipe BP connected with the breather port 26 causes the air including the fuel vapor in the fuel tank FT (shown in FIG. 1) to be recirculated to the filler neck 10 during fueling and thereby ensures smooth fueling. The breather port 26 may be provided at any location on the outer periphery of the filler neck 10.

The neck body 20 including the neck connecting portion 25 and the breather port 26 is configured by stacking two different types of resin materials and has a resin inner layer 28 exposed to the fuel passage 11P and a resin outer layer 29 stacked on the outer surface of the resin inner layer 28. The resin inner layer 28 is made of a resin material having excellent fuel permeation resistance, for example, a polyamide (PA) such as nylon or an ethylene vinyl alcohol copolymer (EVOH) and mainly serves as a barrier layer to suppress permeation of the fuel. The resin outer layer 29 is made of a resin material having excellent mechanical strength, for example, polyethylene (PE) and mainly serves as a layer providing the neck body 20 with the mechanical strength and the impact resistance. The polyethylene used for the resin outer layer 29 may be a modified resin material with maleic acid as the polar functional group (modified polyethylene). The modified polyethylene is joined with PA by chemical adhesion so as to be bonded to the resin inner layer 28.

The retainer 30 is a ring-shaped member configured to provide the mechanical strength and the sealing property to a gasket of the fuel cap (not shown) and is formed by pressing a thin plate of a metal material such as stainless steel. The nozzle guide member 40 is configured to introduce a fuel nozzle of the fuel gun FG to the fuel passage 11P and is mounted to inside of the neck body 20 via a mechanical control mechanism 50. The nozzle guide member 40 includes a guide main body 42 in a cylindrical shape and a nozzle guide wall 44 provided at the approximate center of the guide main body 42 and is formed by injection molding of a resin material such as polyacetal (POM). An inner space of the nozzle guide member 40 forms a portion of the insertion passage 12P. The nozzle guide wall 44 is protruded from the inner wall of the guide main body 42 and is inclined to an insertion direction of the fuel gun FG to face the air passage 26P of the breather port 26.

Figure 3:
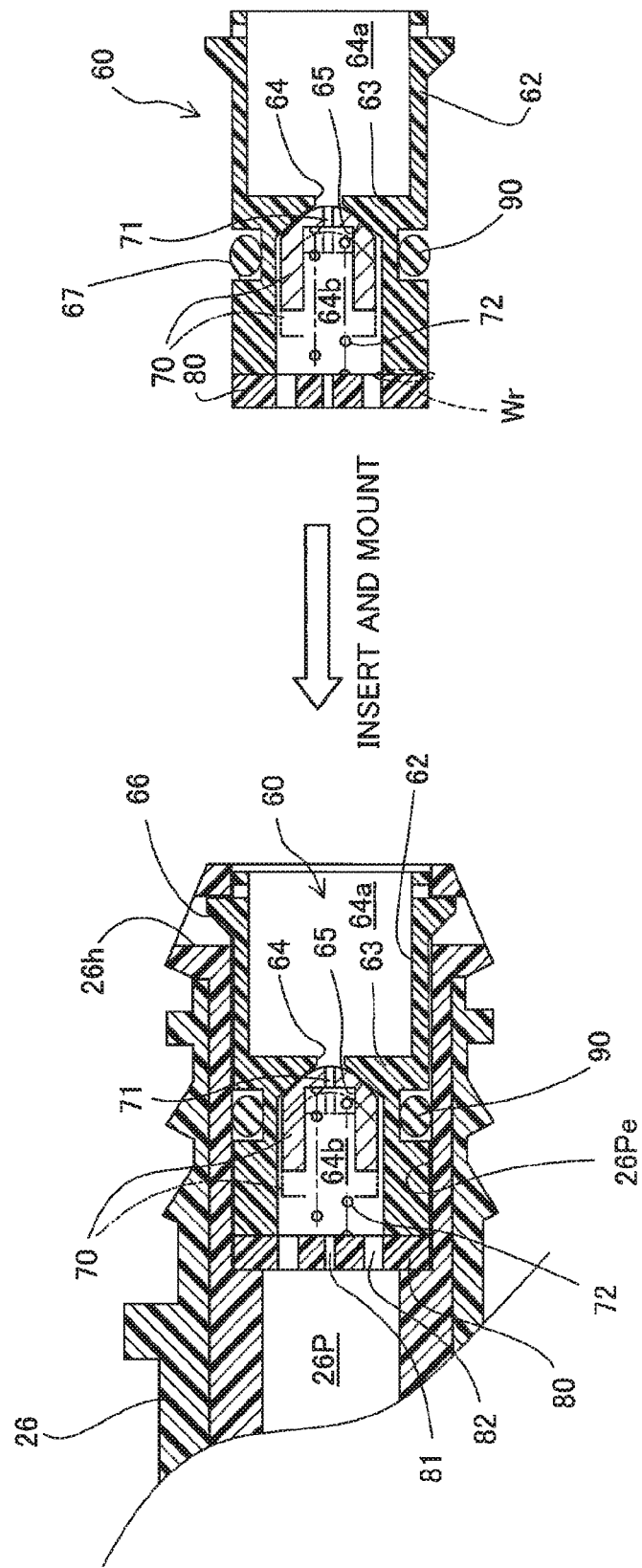
FIG. 3 is a diagram illustrating the configuration of a valve according to the first embodiment mounted in a breather port.
Figure 4:
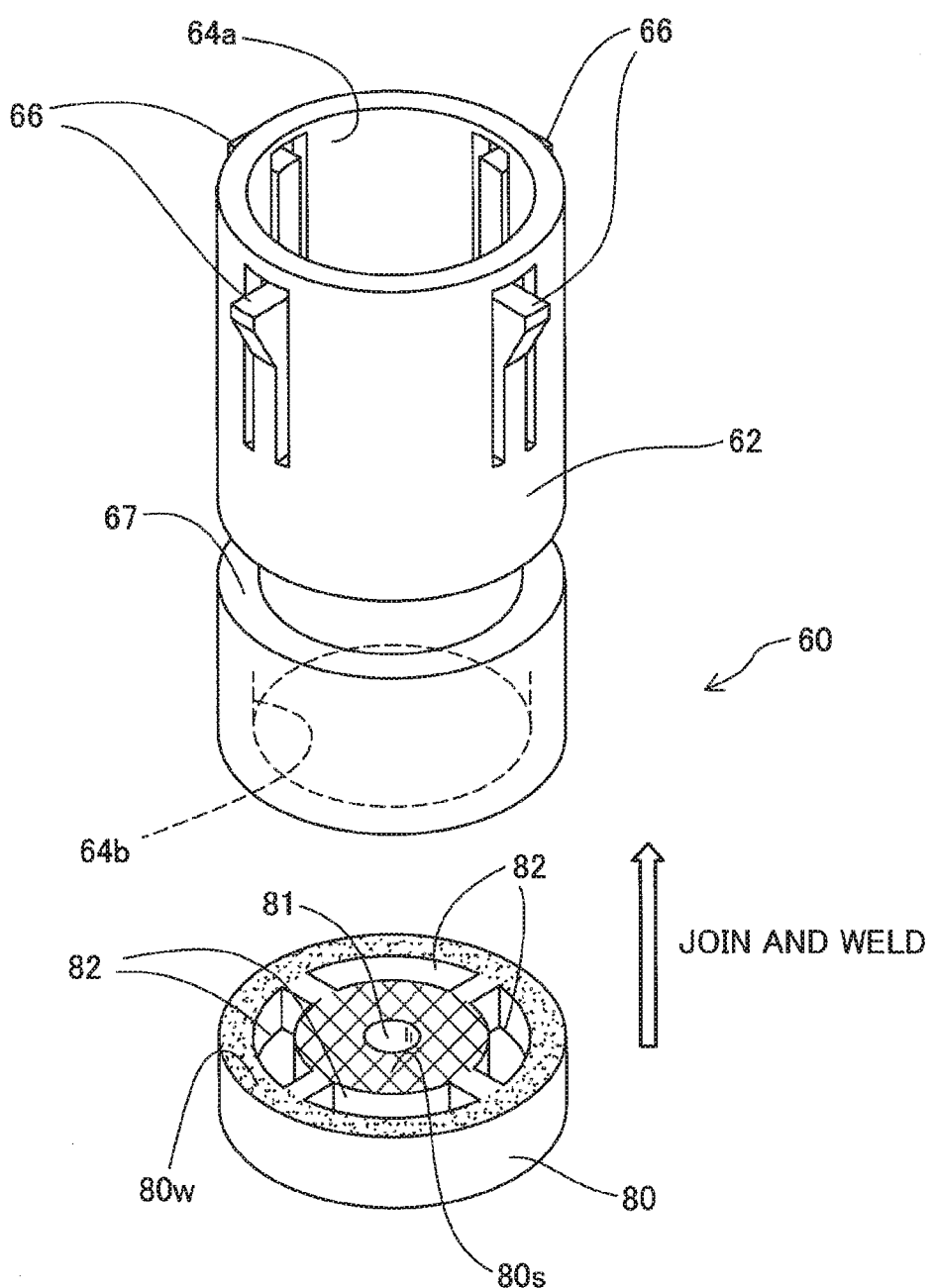
FIG. 4 is a schematic exploded view illustrating the valve.

The valve 60 is placed and mounted in the air passage 26P of the breather port 26 or more specifically in an extended flow path portion 26Pe that is an end portion of the air passage 26P and is sealed by a ring-shaped seal member 90. FIG. 3 is a diagram illustrating the configuration of the valve 60 mounted in the breather port 26. FIG. 4 is a schematic exploded view illustrating the valve 60. As illustrated, the valve 60 includes a valve element 70, a spring 72 and a cover member 80 as valve mechanical components, in addition to a housing 62. The housing 62 is a cylindrical body and has a partition wall 63 arranged to divide inside of the housing 62 into a first chamber 64a and a second chamber 64b. The partition wall 63 has an opening 64 at the center and has a wall surface on the second chamber 64b-side that serves as a valve seat 65 for the valve element 70. The housing 62 has flexible engagement pieces 66 that are arranged at equal pitches on a circumferential wall of the first chamber 64a. The flexible engagement pieces 66 are bendable toward the first chamber 64a. In the mounted state of the valve 60, end projections of the respective flexible engagement pieces 66 are inserted into engagement holes 26h of the breather port 26, so that the flexible engagement pieces 66 are engaged with the breather port 26. A ring-shaped recess 67 is formed on an outer circumferential wall of the housing 62, and the seal member 90 is placed in this ring-shaped recess 67. The valve element 70 has an orifice 71 at the center and is placed along with the spring 72 in the second chamber 64b to be reciprocated in the second chamber 64b. The spring 72 is arranged to press the valve element 70 against the valve seat 65 in a state that the second chamber 64b is closed by the cover member 80. The cover member 80 has a disk shape and is welded to the housing 62 while closing the second chamber 64b. This cover member 80 has a spring seat area 80s that is provided around a center through hole 81 and a welding area 80w that is provided on the outer side of peripheral through holes 82 surrounding the spring seat area 80s and is to be welded to the housing 62. The housing 62 and the cover member 80 described above are made of a heat weldable resin (for example, PE).

A procedure of placing the valve 60 inside of the breather port 26 or more specifically mounting the valve 60 in the extended flow path portion 26Pe of the air passage 26P first assembles the valve 60 alone as an assembled component. More specifically, the valve element 70 and the spring 72 are placed in the second chamber 64b as shown in FIG. 3, and the cover member 80 is then placed to close the second chamber 64b. In this state, heat is applied from laser beam or another heat source to the welding area 80w of the cover member 80 to melt the welding area 80w. This causes the cover member 80 to be heat welded to the housing 62 by a ring-shaped welding region Wr shown in FIG. 3. The valve 60 thus obtained as the assembled component is inserted from the cover member 80-side into the extended flow path portion 26Pe of the air passage 26P in the breather port 26 in the state that the seal member 90 is placed in the ring-shaped recess 67. In the process of such insertion, the end projections of the flexible engagement pieces 66 come into contact with the inner wall of the extended flow path portion 26Pe, so that the flexible engagement pieces 66 are bent toward the first chamber 64a. When the cover member 80 enters the depth of the extended flow path portion 26Pe, the end projections of the flexible engagement pieces 66 are inserted into the engagement holes 26h of the breather port 26. The flexible engagement pieces 66 are then returned to the original state so as to be engaged with the breather port 26. This completes mounting of the valve 60 from the end of the breather port 26 and causes the valve 60 to be held in the extended flow path portion 26Pe of the breather port 26.

In this mounted state, the housing 62 is placed in the air passage 26P or more specifically inside of the extended flow path portion 26Pe that is the end portion of the air passage 26P with a predetermined tolerance, such that the opening 64 is located at the end of the breather port 26. The valve element 70 is arranged to be reciprocated along the air passage 26P in the second chamber 64b that is inside of the housing 62, so as to open and close the opening 64. The spring 72, in cooperation with the welded cover member 80, provides a pressing assembly configured to press the valve element 70 toward the opening 64. In the state that the valve element 70 is pressed, the valve 60 allows the air to be recirculated from the extended flow path portion 26Pe of the air passage 26P toward the fuel passage 11P of the neck body 20 and regulates the recirculation flow rate of the air by using the pressure of the air. The valve element 70 has the orifice 71, so that the valve 60 allows for circulation of the air between the fuel passage 11P and the end of the breather port 26 across the valve element 70 even in the state that the opening 64 of the housing 62 is closed by the valve element 70.

Figure 5:
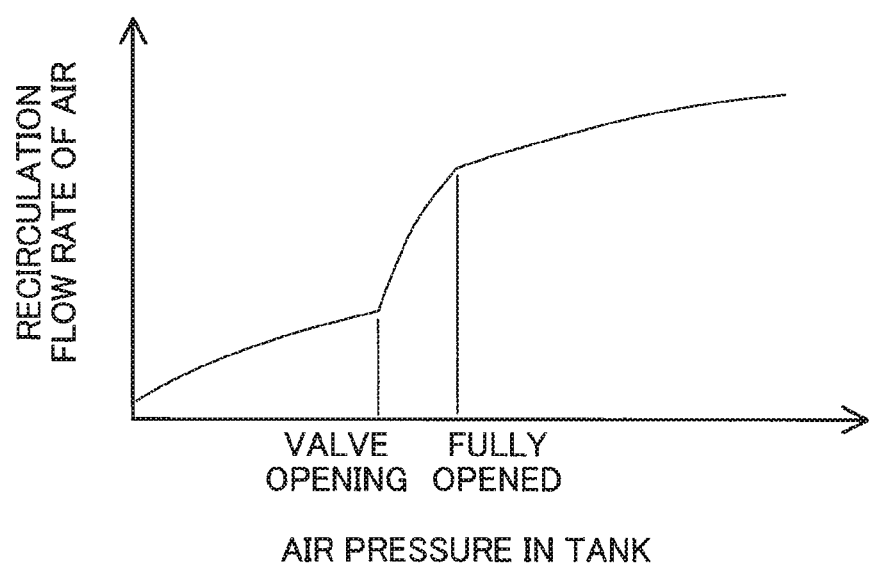
FIG. 5 is a graph showing a relationship between the air pressure in the tank and the recirculation flow rate of the air during fueling.

The following describes recirculation of the air from the fuel tank FT in the fuel supply apparatus FS including the filler neck 10 in which the valve 60 of the above configuration is mounted. FIG. 5 is a graph showing a relationship between the air pressure in the tank and the recirculation flow rate of the air during fueling. After a start of fueling from the fuel gun FG (shown in FIG. 1), the air pressure in the fuel tank FT increases in the progress of fueling. This air pressure is applied from the first chamber 64a-side to the valve element 70 of the valve 60 by the air (the air including the fuel vapor) flowing through the breather pipe BP. In the initial stage of fueling, the air pressure in the fuel tank FT has no significant increase, so that the valve element 70 closes the opening 64 with the pressing force of the spring 72. Even in this state, the air including the fuel vapor is recirculated through the orifice 71 to the filler neck 10. The recirculation flow rate of the air is determined according to the orifice diameter and the air pressure and is low in this state. When the air pressure in the fuel tank FT increases in the progress of fueling to exceed the pressing force of the spring 72, the valve element 70 is separated from the valve seat 65 to open the valve 60. Accompanied with this valve opening, the recirculation flow rate of air to the filler neck 10 is rapidly increased. After the valve 60 is fully opened where the valve element 70 is maximally distant from the valve seat 65 in the second chamber 64b, the air including the fuel vapor is recirculated to the filler neck 10 at a high flow rate that is determined according to the air pressure and the maximum separation distance between the valve element 70 and the valve seat 65. On completion of fueling with recirculation of the air continuing in the course of fueling, the flow rate and the pressure of the air recirculated through the breather pipe BP are decreased, so that the valve element 70 is placed on the valve seat 65 to close the valve 60.

In the fuel supply apparatus FS of the first embodiment having the above configuration, as shown in FIG. 1, along the pathway of the filler tube TB extended from the filler neck 10 to the fuel tank FT, the breather pipe BP is extended from the fuel tank FT and is connected with the breather port 26 to recirculate the air including the fuel vapor in the fuel tank FT across the valve 60. In the fuel supply apparatus FS of the first embodiment, such recirculation of the air is achieved by simple connection of the breather pipe BP with the breather port 26 with the valve 60 mounted therein and does not need to use any additional connector in the vicinity of the breather port 26. As a result, the fuel supply apparatus FS of the first embodiment allows for downsizing of the configuration in the periphery of the breather port 26 and readily suppresses the breather pipe BP connecting with the breather port 26 from being bent in the vicinity of the breather port 26, thus ensuring the smooth recirculation of the air.

In the fuel supply apparatus FS of the first embodiment, the valve 60 is configured to include the housing 62 that has the shape along the passage of the breather port 26, the valve element 70 that is reciprocated along the passage of the breather port 26 in the second chamber 64b of the housing 62 to open and close the opening 64, and the spring 72 that presses the valve element 70 toward the opening 64. This valve 60 is mounted from the end of the breather port 26 into the extended flow path portion 26Pe of the air passage 26P and is held in the extended flow path portion 26Pe. Accordingly, in the fuel supply apparatus FS of the first embodiment, the valve 60 assembled with the housing 62 is mounted from the end of the breather port 26. This enhances the mountability of the valve 60 in the breather port 26 and enables the valve 60 to be readily mounted in the extended flow path portion 26Pe. Additionally mounting the valve 60 as the assembled component, further enhances the mountability.

In the fuel supply apparatus FS of the first embodiment, the orifice 71 formed in the valve element 70 of the valve 60 allows for circulation of the air between the fuel passage 11P and the end of the breather port 26 across the valve element 70 even in the state that the opening 64 of the housing 62 is closed by the valve element 70. Accordingly, the fuel supply apparatus FS of the first embodiment ensures circulation of the air at the flow rate allowed by the orifice 71 even in the state that the opening 64 is closed by the valve element 70.

Figure 6:
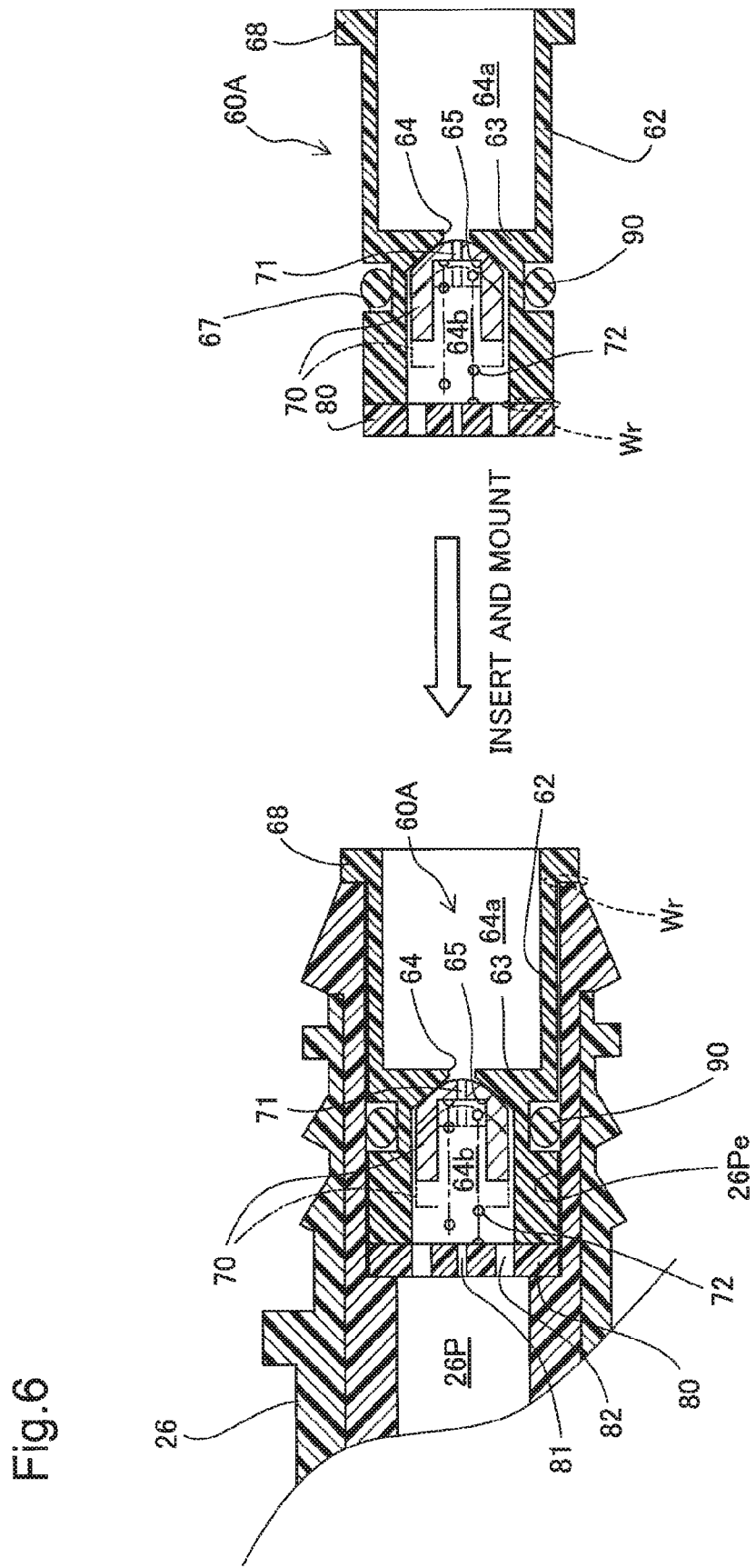
FIG. 6 is a diagram illustrating the configuration of a valve according to a first modification of the first embodiment mounted in the breather port.

The following describes modifications of the first embodiment. FIG. 6 is a diagram illustrating the configuration of a valve 60A according to a first modification mounted in the breather port 26. As illustrated, this valve 60A is characterized by welding a housing 62 to the breather port 26. The housing 62 has a ring-shaped enlarged diameter portion 68 at an opening end of a first chamber 64a. The valve 60A of the modification is also provided as an assembled component prior to be being mounted, like the valve 60 described above. In the state that the cover member 80 is welded, the valve 60A assembled with the housing 62 is inserted from a cover member 80-side into the extended flow path portion 26Pe of the air passage 26P in the breather port 26. When the cover member 80 enters the depth of the extended flow path portion 26Pe, the enlarged diameter portion 68 of the housing 62 is joined with an end face of the breather port 26. In this state, heat is applied from laser beam or another heat source to melt the enlarged diameter portion 68 and heat weld the enlarged diameter portion 68 to the breather port 26 by a ring-shaped welding region Wr. This completes mounting of the valve 60A from the end of the breather port 26 and causes the valve 60A to be held in the extended flow path portion 26Pe of the breather port 26.

In the fuel supply apparatus FS having the valve 60A of the above modification mounted in the breather port 26, recirculation of the air from the fuel tank FT described above is achieved by simple connection of the breather pipe BP with the breather port 26 with the valve 60A mounted therein. Accordingly this modification also provides the effects such as downsizing of the configuration in the periphery of the breather port 26, like the embodiment described above.

Figure 7:
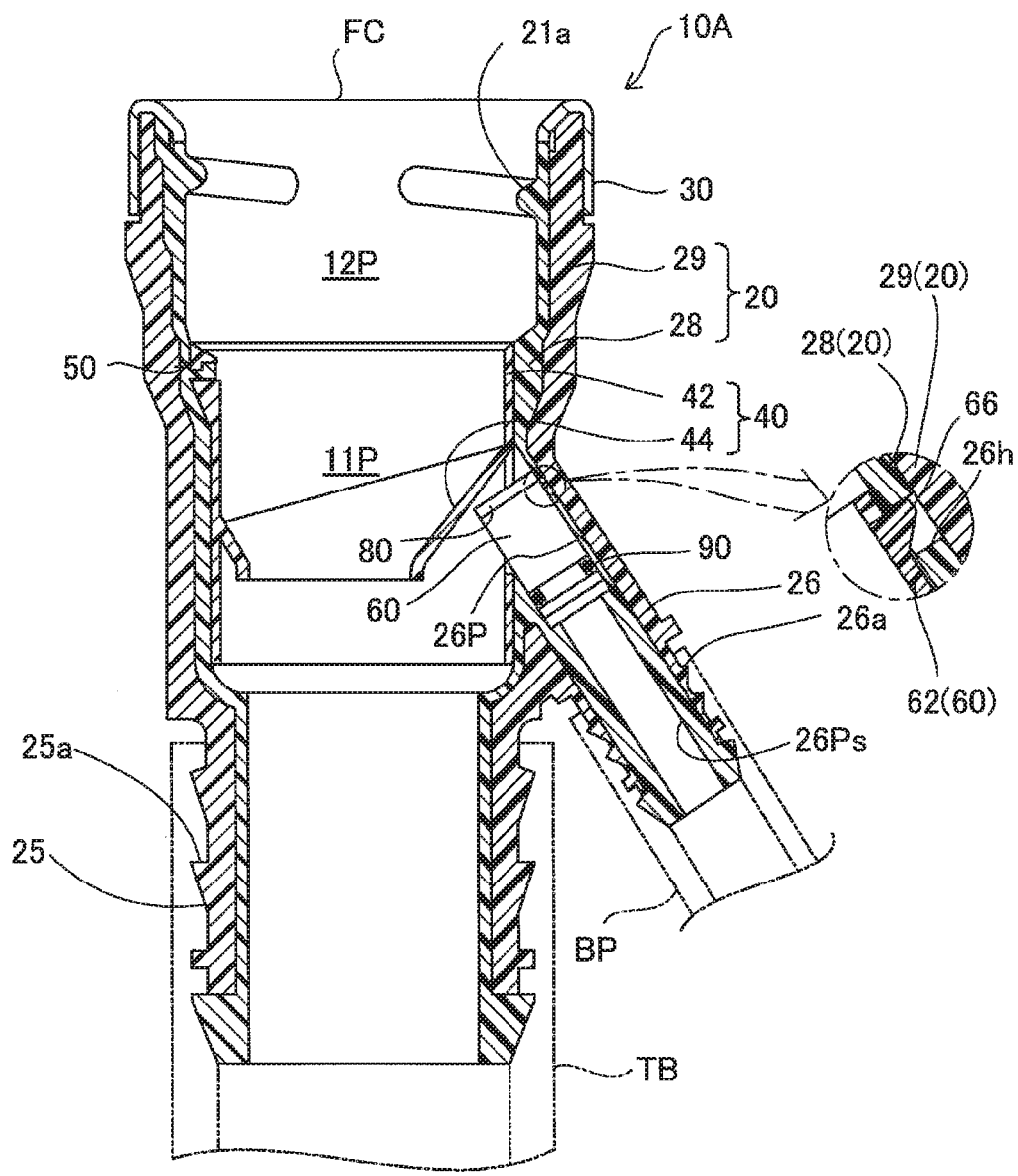
FIG. 7 is a diagram illustrating the configuration of a filler neck according to a second modification of the first embodiment.

FIG. 7 is a diagram illustrating the configuration of a filler neck 10A according to a second modification. As illustrated, this filler neck 10A is characterized by mounting a valve GO from a fuel passage 11P-side into a breather port 26. The valve 60 that is to be mounted in the breather port 26 is identical with the valve 60 of the first embodiment. Due to the difference in mounting direction, the breather port 26 has a reduced diameter flow path portion 26Ps having the smaller diameter than that of the air passage 26P on a connecting end side of the breather pipe BP. As shown by an enlarged view of FIG. 7, the breather port 26 has engagement holes 26h in the neighborhood of a location at which the breather port 26 is branched off from the fuel passage 11P. The flexible engagement pieces 66 of the valve 60 are inserted into the engagement holes 26h, so that the valve 60 is held in the breather port 26. The engagement holes 26h are formed to pass through the resin inner layer 28 but to be blocked by the resin outer layer 29. Before the nozzle guide member 40 is mounted to the filler neck 10A, the valve 60 is mounted from the fuel passage 11P-side into the air passage 26P of the breather port 26. In the illustration, one end of the valve 60 is protruded into the fuel passage 11P. The valve 60 is, however, covered by the nozzle guide wall 44 of the nozzle guide member 40 and accordingly does not interfere with the fuel gun FG (shown in FIG. 1). The entire valve 60 may be placed inside of the air passage 26P.

In the fuel supply apparatus FS having the filler neck 10A of the above modification, recirculation of the air from the fuel tank FT described above is achieved by simple connection of the breather pipe BP with the breather port 26 with the valve 60 mounted therein. Accordingly this modification also provides the effects such as downsizing of the configuration in the periphery of the breather port 26, like the embodiment described above.

Figure 8A:
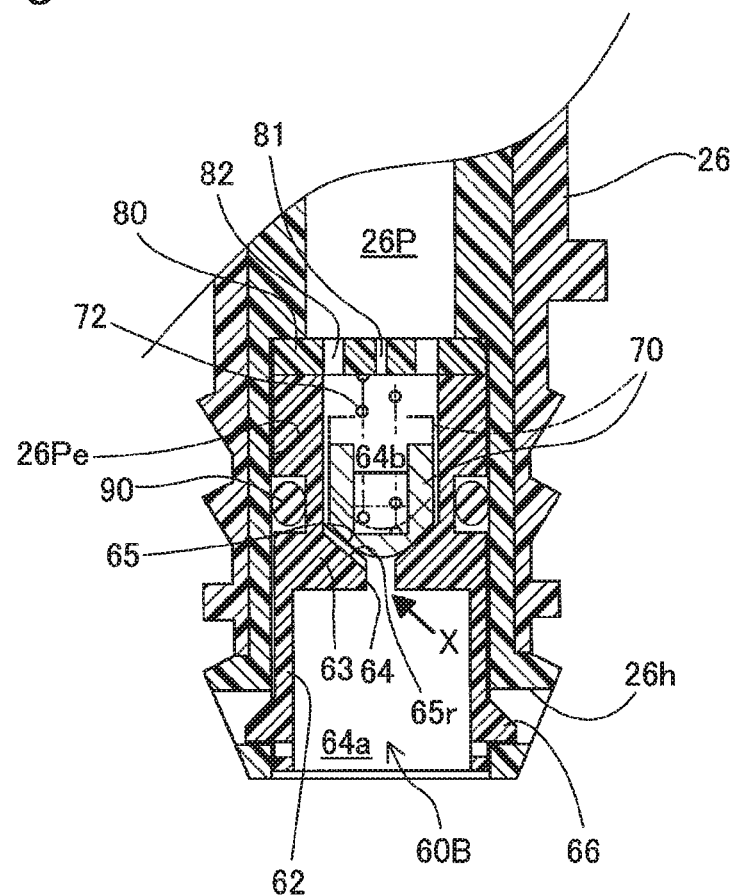
FIG. 8A is a diagram illustrating the configuration of a valve according to a third modification of the first embodiment mounted in the breather port.
Figure 8A:
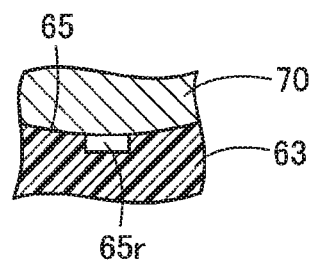

FIG. 8A is a diagram illustrating the configuration of a valve 60B according to a third modification mounted in the breather port 26. As illustrated, this valve 60B is characterized by the configuration that the valve element 70 has no orifice 71 and that the valve seat 65 has a recessed groove 65r serving as an orifice or an opening in place of the orifice 71. The other configuration of the valve 60B and the procedure of mounting the valve 60B are similar to those described above with regard to the valve 60. The recessed groove 65r is formed along the wall surface of the valve seat 65 from the opening 64 to a location reaching the second chamber 64b. As shown by a schematic view in the direction of arrow X, the recessed groove 65r serves as an orifice between the valve element 70 and the valve seat 65, in place of the orifice 71. The fuel supply apparatus FS with the valve 60B of this modification mounted in the breather port 26 provides the effects such as downsizing of the configuration in the periphery of the breather port 26, like the embodiment described above, and additionally increases the flexibility of the configuration of the orifice. In the third modification, the recessed groove 65r may be provided in the valve element 70.

Figure 8B:
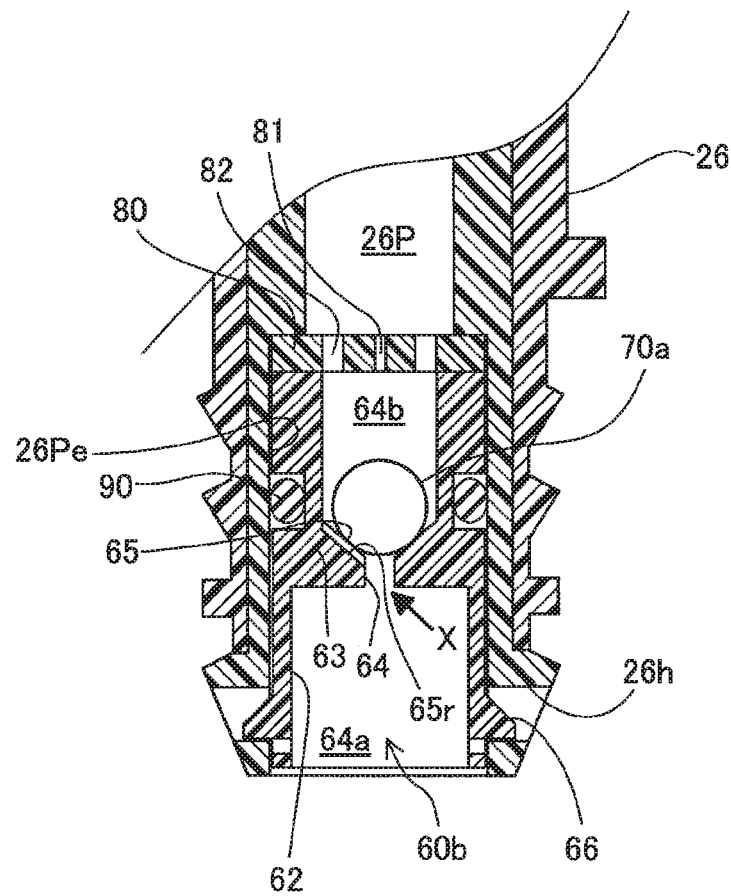
FIG. 8B is a diagram illustrating the configuration of a valve according to a fourth modification of the first embodiment.
Figure 8B:
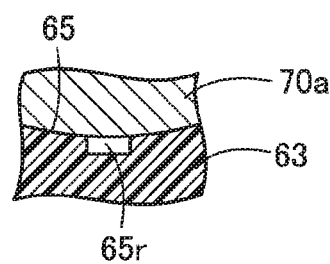

The following describes a fourth modification of the first embodiment. A valve 60b according to the fourth modification has a ball 70a, in place of the valve element 70, as shown in FIG. 8B. The ball 70a is not shown as the sectional view in FIG. 8B. As illustrated in FIG. 1, the breather port 26 of the embodiment is arranged in the approximately vertical direction. In the state of low air pressure, the ball 70a is seated on the valve seat 65 by its dead weight. The presence of a recessed groove 65r allows for recirculation of the air even in this state. When the air pressure in the fuel tank FT increases in the progress of fueling to exceed the dead weight of the ball 70a, the ball 70a is separated from the valve seat 65 to open the valve 60b. This modification also enables a sufficient amount of the air to be recirculated, like the embodiment and the modifications described above. In this modification, the air pressure in the tank at the start of valve opening shown in FIG. 5 is determined according to the dead weight of the ball 70a. The air pressure at the start of valve opening can be adjusted by selecting the material of the ball 70a among resins, metals and composite materials thereof to regulate the dead weight. The fourth modification using the ball 70a further simplifies the configuration of the valve 60b. In the configuration using the ball 70a, a spring 72 may be additionally used to increase the force of pressing the ball 70a against the valve seat 65. In the third and the fourth modifications, a plurality of recessed grooves 65r may be provided.

B. Second Embodiment

Figure 9:
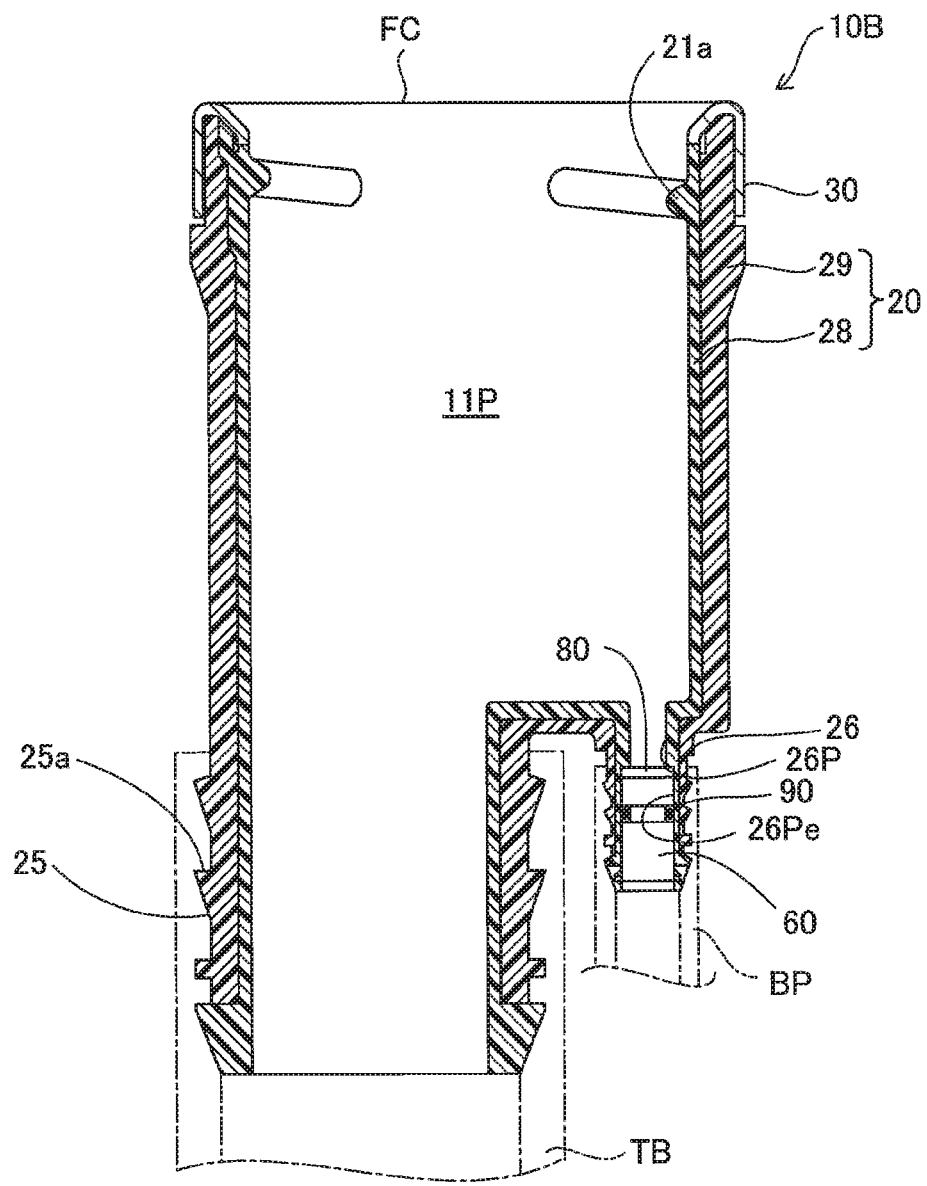
FIG. 9 is a diagram illustrating a section of a filler neck in the longitudinal direction according to a second embodiment.

FIG. 9 is a diagram illustrating a section of a filler neck 10B in the longitudinal direction according to a second embodiment. As illustrated, the filler neck 10B of the second embodiment is characterized by the configuration that a breather port 26 is protruded in parallel to a neck connecting portion 25 from a neck body 20 at a lower end of the neck body 20. The passage configuration in the breather port 26, the configuration of the valve 60 and the procedure of mounting the ale 60 from the end of the breather port 26 are similar to those described above with regard to the filler neck 10 of the first embodiment. Accordingly the fuel supply apparatus FS having the filler neck 10B of the second embodiment with the valve 60 mounted in the breather port 26 protruded in parallel to the neck connecting portion 25 provides the effects such as downsizing of the configuration in the periphery of the breather port 26, like the embodiment described above.

Figure 10:
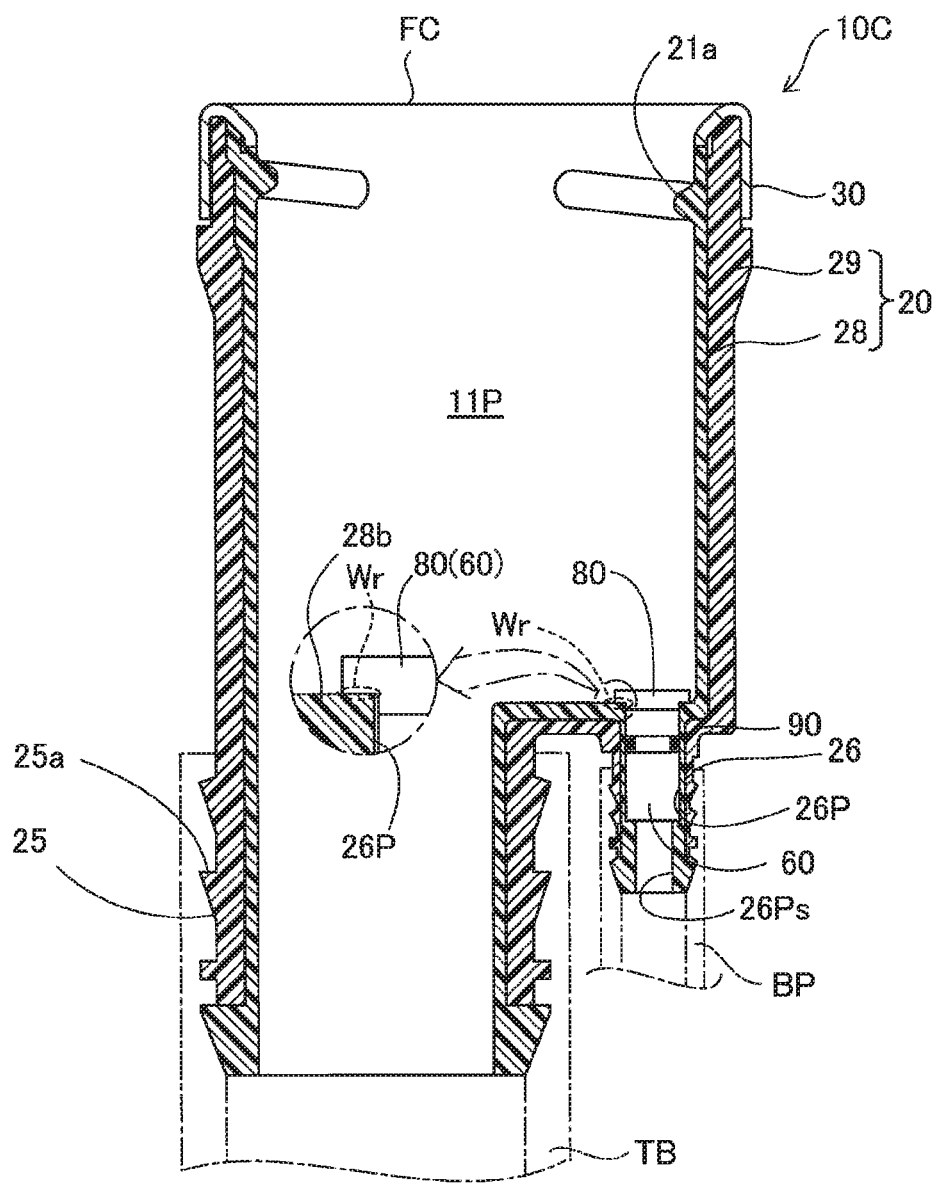
FIG. 10 is a diagram illustrating the configuration of a filler neck according to a first modification of the second embodiment.

FIG. 10 is a diagram illustrating the configuration of a filler neck 10C according to a first modification of the second embodiment. As illustrated, this filler neck 10C is characterized by the configuration that a valve 60 is mounted from a fuel passage 11P-side into a breather port 26 protruded in parallel to a neck connecting portion 25 from a neck body 20 and by the technique employed to hold the valve 60 in the breather port 26. Due to the difference in mounting direction, the breather port 26 has a reduced diameter flow path portion 26Ps having the smaller diameter than that of the air passage 26P on a connecting end side of the breather pipe BP. The valve 60 of this modification differs from the valve 60 of the first embodiment by omission of the flexible engagement pieces 66 and the configuration of a cover member 80 as a flanged cover member as shown in an enlarged view of FIG. 10. As described above, the valve 60 is provided as an assembled component prior to being mounted into the breather port 26. The valve 60 with the flanged cover member 80 welded thereto is inserted from the first chamber 64a-side of the housing 62 (shown in FIG. 4) into the air passage 26P of the breather port 26. When the valve 60 enters the depth of the air passage 26P the flange of the cover member 80 comes into contact with a bottom wall 28b of the resin inner layer 28 of the neck body 20. In this state, heat is applied from laser beam or another heat source to the flange of the cover member 80 to melt the flange of the cover member 80, and the flange of the cover member 80 is heat welded to the bottom wall 28b by a ring-shaped welding region Wr. This completes mounting of the valve 60 from the fuel passage 11P-side and causes the valve 60 to be held in the air passage 26P of the breather port 26. In this state, part of the valve 60 including at least one of the housing 62, the orifice 71 and the spring 72 is placed in the breather port 26.

In the fuel supply apparatus FS having the filler neck 10C of the above modification, recirculation of the air from the fuel tank FT described above is achieved by simple connection of the breather pipe BP with the breather port 26 with the valve 60 mounted therein. Accordingly this modification also provides the effects such as downsizing of the configuration in the periphery of the breather port 26, like the embodiment described above.

Figure 11:
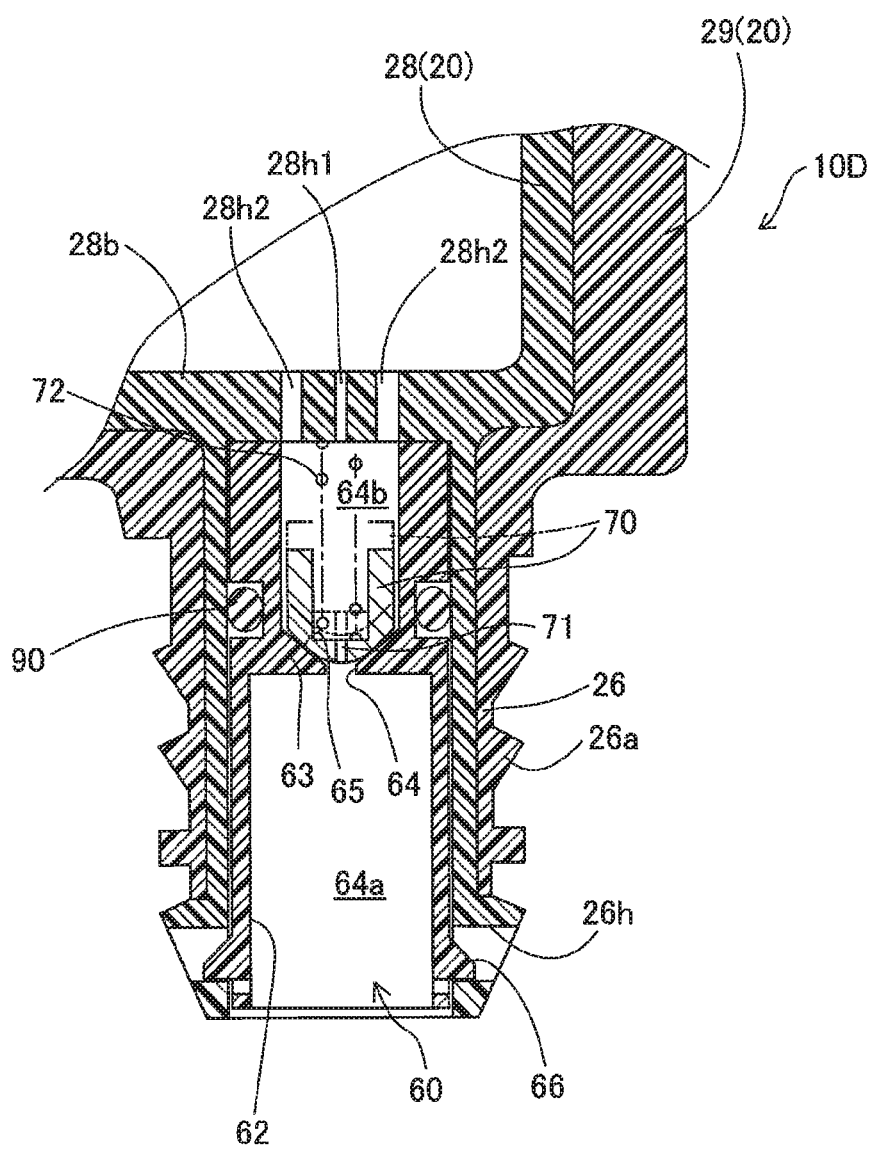
FIG. 11 is a diagram illustrating the configuration of a main part of a filler neck according to a second modification of the second embodiment.

FIG. 11 is a diagram illustrating the configuration of a main part of a filler neck 10D according to a second modification of the second embodiment. As illustrated, this filler neck 10D is characterized by using a valve 60 without a cover member 80 and substituting a bottom wall 28b for the cover member 80. The filler neck 10D has a first through hole 28h1 and second through holes 28h2 in the bottom wall 28b of the resin inner layer 28 of the neck body 20. The first through hole 28h1 is located at the center of the air passage 26P in the breather port 26. The second through holes 28h2 are located on the outer side of the first through hole 28h1 to surround the first through hole 28h1. When these through holes 28h1 and 28h2 are viewed from the second chamber 64b-side, the first through hole 28h1 and the second through holes 28h2 have the similar configuration and arrangement to those of the center through hole 81 and the peripheral through holes 82 in the cover member 80 shown in FIG. 4. Accordingly the bottom wall 28b having these through holes 28h1 and 28h2 has the function of recirculating the air and the function of receiving the spring, in place of the cover member 80. The valve 60 without the cover member 80 is mounted in the air passage 26P of the breather port 26, and the flexible engagement pieces 66 are placed into the engagement holes 26h, so that the valve 60 is held in the air passage 26P of the breather port 26. In this state, part of the valve 60 including at least one of the housing 62, the orifice 71 and the spring 72 is placed in the breather port 26.

In the fuel supply apparatus FS having the filler neck 10D of the above modification, recirculation of the air from the fuel tank FT described above is achieved by simple connection of the breather pipe BP with the breather port 26 with the valve 60 mounted therein. Accordingly this modification also provides the effects such as downsizing of the configuration in the periphery of the breather port 26, like the embodiment described above.

Figure 12:
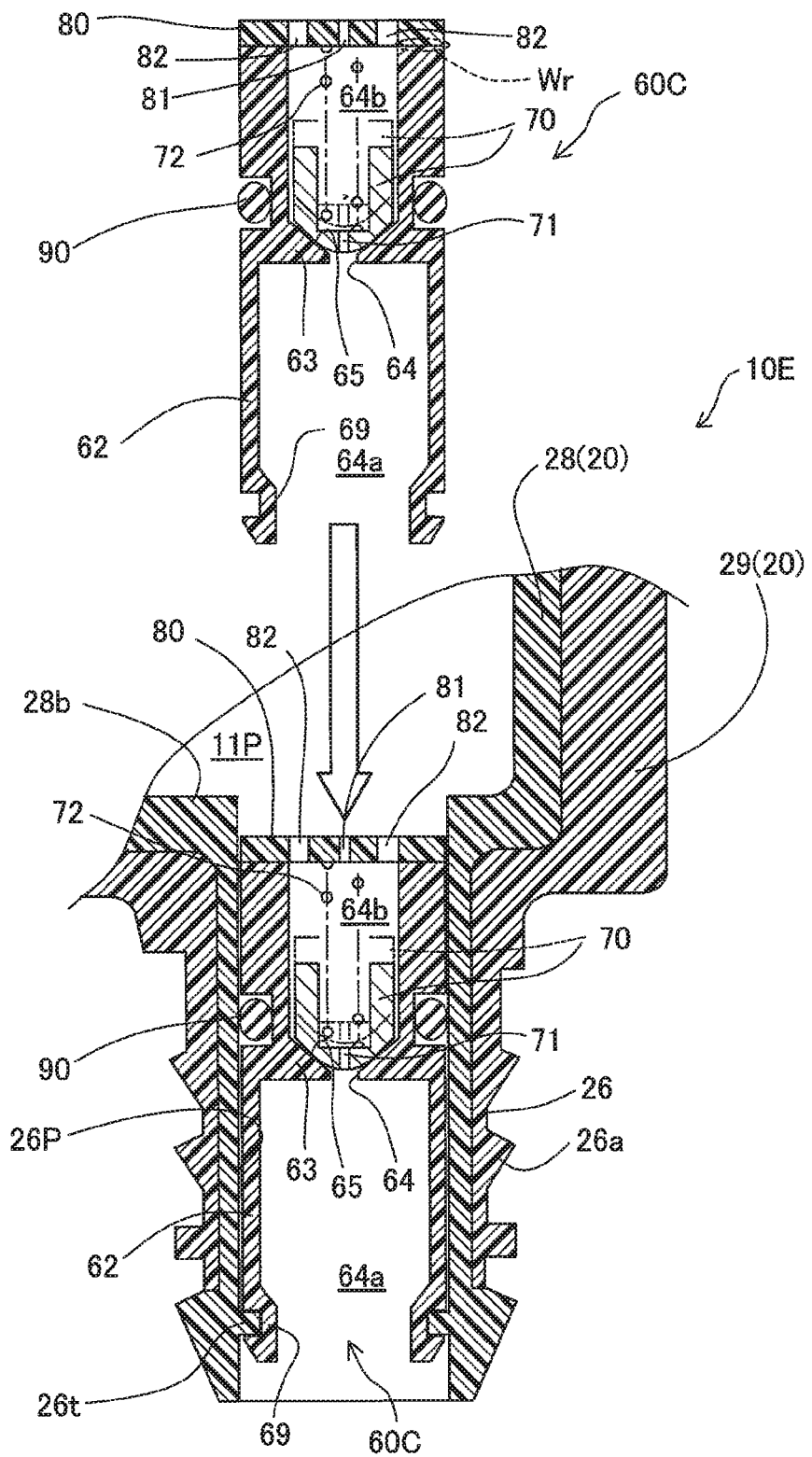
FIG. 12 is a diagram illustrating the configuration of a main part of a filler neck according to a third modification of the second embodiment.

FIG. 12 is a diagram illustrating the configuration of a main part of a filler neck 10E according to a third modification of the second embodiment. As illustrated, this filler neck 10E has a different valve holding configuration in a breather port 26. A valve 60C of this modification has recessed flexible engagement pieces 69 provided in the first chamber 64a of the housing 62. Like the flexible engagement pieces 66 provided in the valve 60 shown in FIG. 4, the recessed flexible engagement pieces 69 are formed at equal pitches in the housing 62 and are bendable toward the first chamber 64a. The valve 60C including the housing 62 with the recessed flexible engagement pieces 69 is also provided as an assembled component prior to being mounted in the breather port 26. The valve 60C is inserted and mounted from the recessed flexible engagement pieces 69-side into the air passage 26P of the breather port 26. When the recessed flexible engagement pieces 69 reach engagement convexes 26t in the course of insertion, the recessed flexible engagement pieces 69 are bent toward the first chamber 64a such as to ride on the engagement convexes 26t in the subsequent insertion process. Further insertion causes the engagement convexes 26y to be placed in the recesses at the ends of the recessed flexible engagement pieces 69 and thereby causes the recessed flexible engagement pieces 69 to be returned to the original state and to be engaged with the breather port 26. This completes mounting of the valve 60C from the fuel passage 11P-side and causes the valve 60C to be held in the air passage 26P of the breather port 26.

In the fuel supply apparatus FS having the flier neck 10E of the above modification, recirculation of the air from the fuel tank FT described above is achieved by simple connection of the breather pipe BP with the breather port 26 with the valve 60C mounted therein. Accordingly this modification also provides the effects such as downsizing of the configuration in the periphery of the breather port 26, like the embodiment described above.

Figure 13:
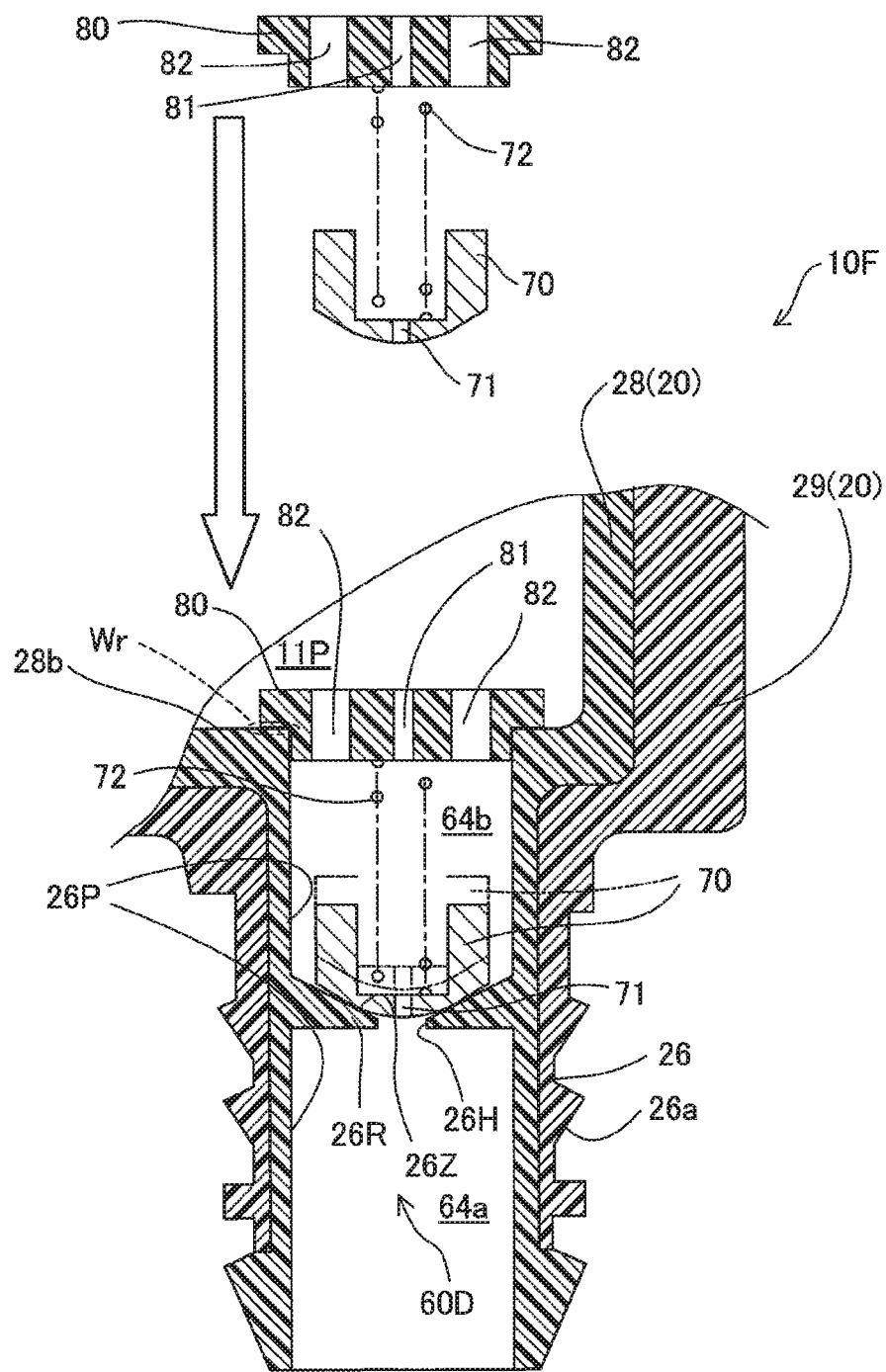
FIG. 13 is a diagram illustrating the configuration of a main part of a filler neck according to a fourth modification of the second embodiment.

FIG. 13 is a diagram illustrating the configuration of a main part of a filler neck 10F according to a third modification of the second embodiment. As illustrated, this filler neck 10F is characterized by substituting a breather port 26 for the housing 62 described above. A valve 60D of this modification includes a valve element 70, a spring 72 and a flanged cover member 80 as valve components. The breather port 26 has a partition wall 26R provided in the middle of the air passage 26P to divide the air passage 26P into a first chamber 64a and a second chamber 64b. The partition wall 26R has an opening 26H at the center and has a wall surface on the second chamber 64b-side that serves as a valve seat 26Z for the valve element 70. In other words, in the valve 60D of this modification, the breather port 26 substitutes for the housing 62 in the air passage 26P. A procedure of mounting the valve 60D in the breather port 26 places the valve element 70 and the spring 72 in this sequence in the second chamber 64b and subsequently mounts the flanged cover member 80 to the opening of the air passage 26P to close the second chamber 64b. In this state, heat is applied from laser beam or another heat source to the flange of the cover member 80 to melt the flange of the cover member 80, and the flange of the cover member 80 is heat welded to the bottom wall 28b by a ring-shaped welding region Wr. This completes mounting of the valve 60D from the fuel passage 11P-side and causes the valve 60D to be held in the air passage 26P of the breather port 26.

In the fuel supply apparatus FS having the filler neck 10F of the above modification, recirculation of the air from the fuel tank FT described above is achieved by simple connection of the breather pipe BP with the breather port 26 with the valve 60D mounted therein. Accordingly this modification also provides the effects such as downsizing of the configuration in the periphery of the breather port 26, like the embodiment described above.

C. Third Embodiment

Figure 14:
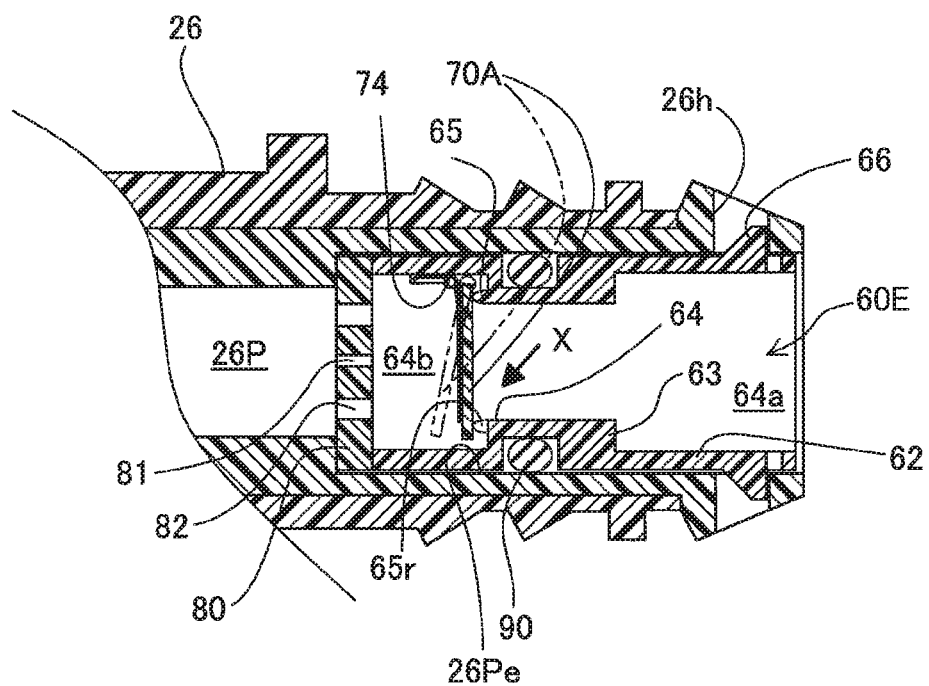
FIG. 14 is a diagram illustrating the configuration of a valve according to a third embodiment mounted in the breather port.
Figure 14:
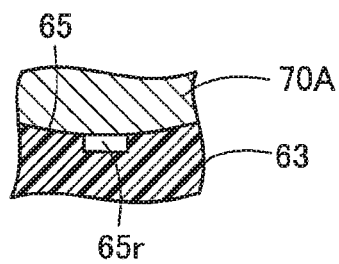

FIG. 14 is a diagram illustrating the configuration of a valve 60F according to a third embodiment mounted in the breather port 26. As illustrated, this valve 60F is characterized by using a flap valve element 70A in place of the valve element reciprocating in the second chamber 64b. The other configuration of the valve 60F and the procedure of mounting the valve 60F are similar to those described above with regard to the valve 60. The valve element 70A is mounted along with a valve element-supporting spring mechanism 74 in the second chamber 64b to be operated to open and close relative to a ring-shaped valve seat 65 that is provided to surround an opening 64 formed by a partition wall 63, so as to open and close the opening 64. The valve element-supporting spring mechanism 74 presses the valve element 70A to close the opening 64 and substitutes for the spring 72 provided in the valve 60 described above. The ring-shaped valve seat 65 has a cutout portion that forms a recessed groove 65r serving as an orifice. The filler neck 10 with the valve 60F that uses the flap valve element 70A to open and close the opening 64 and that is mounted from its end into the breather port 26 also has the advantageous effects described above. The valve element 70A may be provided with an orifice in place of the recessed groove 65r.

The invention is not limited to any of the embodiments and the modifications described above but may be implemented by a diversity of other configurations without departing from the scope of the invention. For example, the technical features of any of the embodiments and modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein.

Each of the modifications of the first embodiment shown in FIGS. 6, 8A and 8B is applicable to the filler neck of the second embodiment illustrated in FIG. 9 and subsequent drawings. Similarly, each of the modifications of the second embodiment shown in FIGS. 11 to 13 is applicable to the filler neck of the first embodiment. In the embodiments and modifications described above, the orifice 71 is provided in the valve element 70. Alternatively the orifice 71 may be provided in the housing 62 as long as the configuration provides recirculation of the air. For example, in the third and the fourth modifications of the first embodiment shown in FIGS. 8A and 8B, an orifice may be provided in place of the recessed groove 65r in the housing 62 to provide a passage for recirculation of the air. An orifice may be provided in addition to the recessed groove.

In the above embodiments and modifications, the neck connecting portion 25 is formed in a fir tree shape having the ring-shaped projection 25a to connect the filler tube TB. According to a modification, the neck connecting portion 25 may be provided as a connector outer wall of a quick connector to connect the filler tube TB. According to another modification, a binding fixture such as a band may be used to connect and fasten the filler tube TB to the neck connecting portion 25. The filler tube TB that is to be connected with the neck connecting portion 25 is not limited to the resin tube but may be a rubber tube or a metal tube.

In the embodiments and their modifications described above, the neck body 20 as the main member of the filler neck 10 has the two-layer structure configured by stacking the resin outer layer 29 on the resin inner layer 28. According to modifications, the neck body 20 may have a single-layer structure made from one single resin or may have a multi-layer structure such as a three- or more-layer structure. The neck body 20 may be made of a metal.

What is claimed is:
1. A fuel supply apparatus, comprising:
a filler neck that is configured to provide a fuel passage communicating with a filler port;
a breather port that is protruded from the filler neck to be connected with a breather pipe, and
a valve that is configured to allow for recirculation of the air from the breather pipe to the fuel passage, wherein
at least part of the valve is placed inside of the breather port,
the valve has a housing configured to place a valve element therein,
the housing and the valve element are mounted and held in the breather port, the valve is provided as an assembled component placed in the housing and is mounted as the assembled component into the breather port to be held in the breather port, the valve element of the valve is configured to be operated to open and close an opening formed in the housing at an end of the breather port, and the valve comprises a pressing member that is configured to press the valve element to close the opening.

2. The fuel supply apparatus according to claim 1, wherein the valve element is configured to be reciprocated relative to or to be operated to open and close relative to a valve seat provided to surround the opening.

3. The fuel supply apparatus according to claim 2, wherein the valve has an orifice that is configured to provide recirculation of the air even in a state that the opening is closed by the valve element.

4. The fuel supply apparatus according to claim 3, wherein the orifice is provided in at least one of the valve element and the housing.

5. The fuel supply apparatus according to claim 2, wherein the valve has a recessed groove provided in at least one of the valve element and the valve seat at a location where the valve element is seated on the valve seat.

6. A fuel supply apparatus, comprising:
   a filler neck that is configured to provide a fuel passage communicating with a filler port;
   a breather port that is protruded from the filler neck to be connected with a breather pipe, and
   a valve that is configured to allow for recirculation of the air from the breather pipe to the fuel passage, wherein
   at least part of the valve is placed inside of the breather port,
   the valve is placed in a housing,
   the housing is formed by the breather port, and
   the valve comprises:
      a valve element that is placed in the housing and is configured to be operated to open and close an opening formed in the housing at an end of the breather port; and
      a pressing member that is configured to press the valve element to close the opening.

7. The fuel supply apparatus according to claim 6, wherein the valve element is configured to be reciprocated relative to or to be operated to open and close relative to a valve seat provided to surround the opening.

8. The fuel supply apparatus according to claim 7, wherein the valve has an orifice that is configured to provide recirculation of the air even in a state that the opening is closed by the valve element.

9. The fuel supply apparatus according to claim 8, wherein the orifice is provided in at least one of the valve element and the housing.

10. The fuel supply apparatus according to claim 7, wherein the valve has a recessed groove provided in at least one of the valve element and the valve seat at a location where the valve element is seated on the valve seat.

* * * * *